United States Patent

[11] 3,589,460

[72] Inventor Stan B. Hanssen
 Kenilworth, Ill.
[21] Appl. No. 817,473
[22] Filed Apr. 18, 1969
[45] Patented June 29, 1971
[73] Assignee Hanson Scale Company

[54] READOUT MECHANISM FOR BATHROOM SCALE
 7 Claims, 5 Drawing Figs.
[52] U.S. Cl. .................................................. 177/256
[51] Int. Cl. ................................................ G01g 21/08
[50] Field of Search ........................................... 177/168,
 169, 170, 202, 256, 257

[56] References Cited
 UNITED STATES PATENTS
3,460,642 8/1969 Provi et al. ...................... 177/256
 FOREIGN PATENTS
1,070,904 6/1967 Great Britain ................. 177/256

Primary Examiner—Richard B. Wilkinson
Assistant Examiner—George H. Miller, Jr.
Attorney—Hofgren, Wegner, Allen, Stellman and McCord ABSTRACT: An improvement in the readout mechanism for a platform-type bathroom scale characterized by the provision of a readout mechanism frame which supports the scale disc, crank element and zero adjust mechanism. A torsion spring is mounted on one leg of a pinlike fastening device which holds components of the readout mechanism such as the crank assembly of the scale lever system to the framework thereof, with the legs of the torsion spring being biased against other portions of the lever assembly framework in such a fashion as to urge the pinlike elements of the zero adjust lever and the pin fasteners for the bellcrank system against one side of the openings provided therefor in the framework and linkage and thereby eliminate relative movement of these components within the openings.

PATENTED JUN 29 1971

INVENTOR
Stan B. Hanssen

BY Hofgren, Wegner, Allen, Stellman & Cord
ATTORNEYS

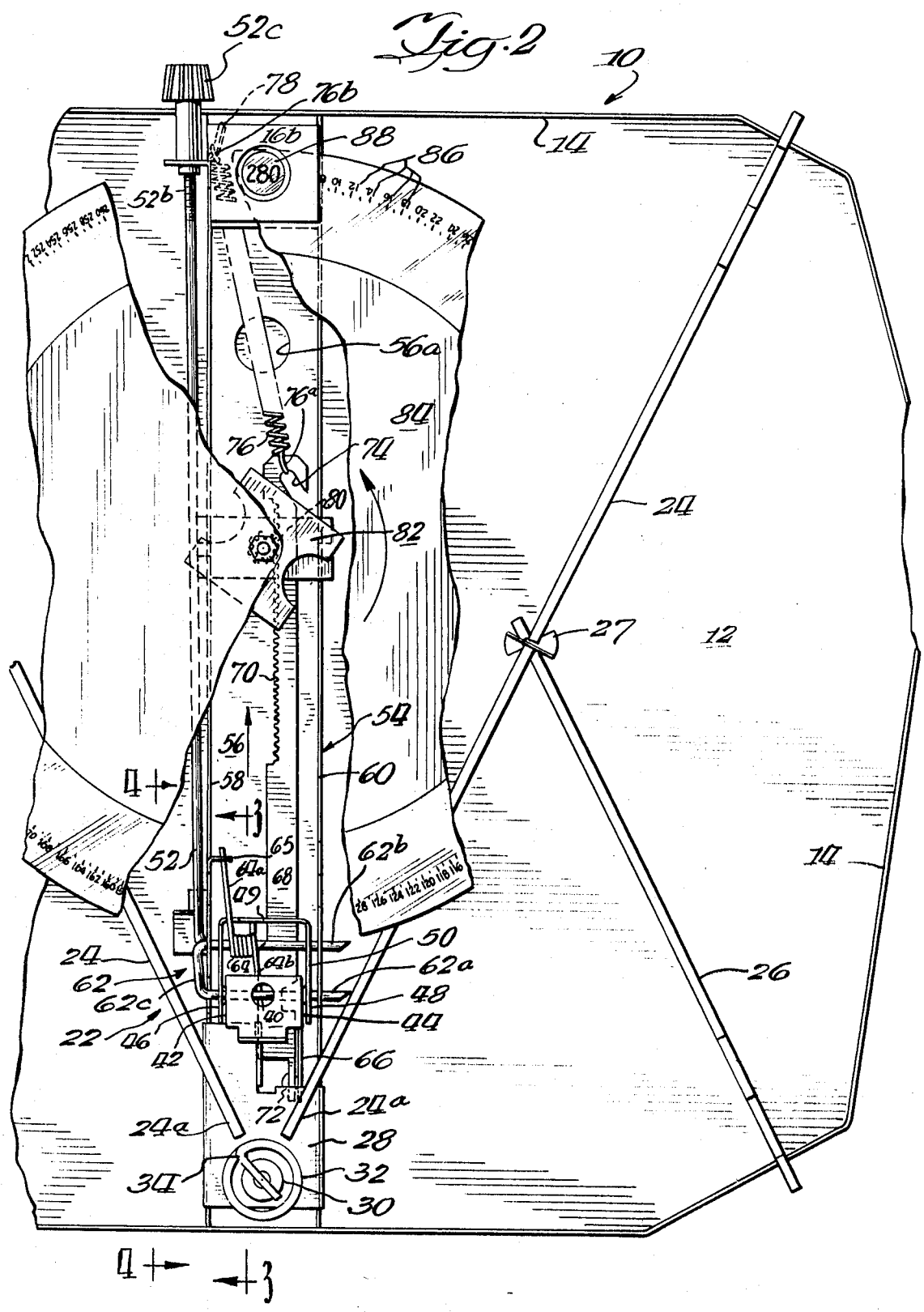

3,589,460

READOUT MECHANISM FOR BATHROOM SCALE

BACKGROUND OF THE INVENTION

1. Field of the Invention

This invention relates to weighing devices, and more particularly, to an improvement in the readout mechanism of a platform-type bathroom scale.

2. Brief Description of the Prior Art

This invention is an improvement in the structure of the bathroom scale generally shown in the copending Hanson et al. application Ser. No. 734,273, filed June 4, 1968, entitled "Bathroom Scale" and assigned to the assignee of this invention. More particularly, it is an improvement in the structure of the lever system and the zero adjust mechanism associated therewith, as well as the zero adjustment and readout mechanism shown in U.S. Pat. No. 3,134,451 also assigned to the assignee of this invention. Generally speaking, the components of the weight sensing mechanism of these bathroom scales include levers and cranks, springs and frame pieces much of which, especially the framework, is formed from sheet metal stamping. The crank and lever components are connected to the framing by suitable pin-type connections which pass through openings formed in the stampings. Both the pin-type fastenings as well as the openings in the framing are formed within certain tolerance limits. It is neither practical nor possible from a manufacturing standpoint to achieve a perfect fit between the pin-type fasteners and the openings formed in the framework such that there would be absolutely no tolerance or play between these components following the assembly thereof. Generally speaking, the tolerances are within 0.002 inches and this will occasion some slight relative play between the components which slightly affects the accuracy of the scale readout.

SUMMARY OF THE INVENTION

This invention is directed, in brief, to the provision of an improvement in the readout mechanism of a bathroom-type platform scale such as to eliminate relative movement between the components of the lever and crank system which are held together in assembled relationship by pin-type fastening members extending through openings in a framework.

The best mode currently contemplated by us for carrying out the invention includes the provision of a self-contained readout mechanism having a torsion spring about one of the fasteners that secures the carrier for the bellcrank assembly to the frame of the readout mechanism and also secures the zero adjust linkage to the frame, with one leg of the torsion spring biased against the frame and the other leg biased against another pin-type fastener which rotatably secures the bellcrank to the bellcrank carrier. The location of the biasing legs of the torsion spring is such as to cause each of the pin-type fasteners and pinlike end of the zero adjust link to be urged continually against one side of the opening into which the components are assembled so as to eliminate relative movement between these pinlike portions and their respective openings and thereby increase the accuracy of the readout provided by the scale weight sensing mechanism.

BRIEF DESCRIPTION OF THE DRAWINGS

FIG. 2 is a fragmentary enlarged view of the base portion of the scale shown in FIG. 1 with parts broken away for clarity of illustration;

Figure 1:
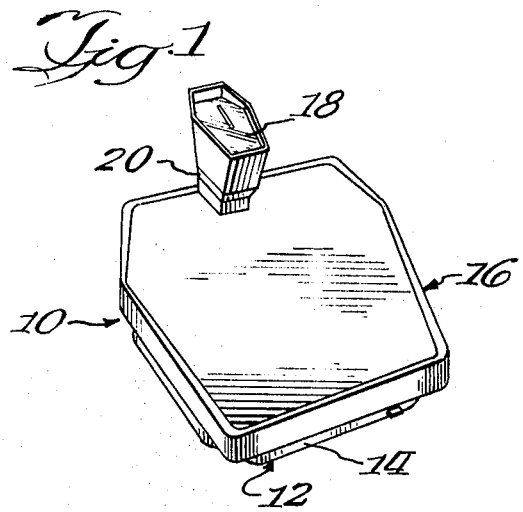
FIG. 1 is a perspective view of a bathroom scale embodying the improvement in the weight sensing mechanism of this invention.
Figure 5:
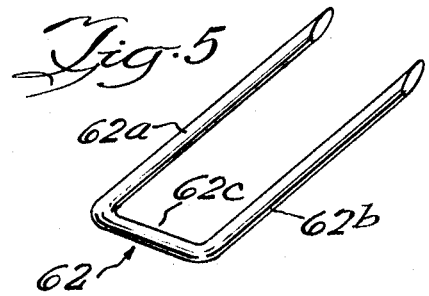
FIG. 5 is a perspective view of a pin-type fastening component utilized in the weight sensing mechanism of this invention.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

Referring initially to FIG. 1, there is shown a platform-type bathroom scale 10 including a base 12, preferably made of a sheet metal, having an upstanding peripheral rim 14. The scale further includes a top or platform 16 also preferably made from sheet metal. An indicia viewing window 18 is provided at the top of a column 20 for viewing the indicia representing the weight applied to the platform 16 and sensed by mechanism to be described herein.

Generally speaking, the exterior design of the scale is similar to that shown and described in our copending application Ser. No. 734,273 entitled "Bathroom Scale" filed June 4, 1968, assigned to the assignee of this invention, and also in the design patent of Dana W. Mox entitled "Bathroom Scale" No. D-213,588 issued Mar. 18, 1969, and also assigned to the assignee of this invention. The weight sensing mechanism 22 in base 12 is also similar to that shown and described in our copending application Ser. No. 734,273, and further similar to that described and claimed in the patent to S. B. Hanson, No. 3,134,451, issued May 26, 1964, and also assigned to the assignee of this invention.

The weight sensing mechanism includes pairs of primary levers 24 and pairs of secondary levers 26 (only one shown herein) each of which overhangs the rim 14 of the base and are connected together by suitable connecting means 27 for conjoint movement. It is intended that portions of each of levers 24 and 26 will abut the underside of platform 16 so that when weight is applied to the platform 16, the levers will be deflected downwardly.

Free ends 24a of each of levers 24 seat upon calibrating washer extension 28. Washer extension 28 is mounted about an upstanding post 30 and normally supported by a tension spring 32 positioned about the post and secured in a slot 34 at the top thereof. The washer extension 28 has a crank engaging portion 36 which abuts the underside of the lip 38 of crank 40. As the calibrating washer extension 28 moves up and down responsive to the deflection of the lever system 24 and 26, this movement is sensed by the crank 40 and is transmitted into rotational movement of the crank.

Crank 40 has two generally spaced-apart ears 42 and 44, each of which has through openings 42a and 44a which are generally aligned with each other. Ears 42 and 44 of crank 40 lie between ears 46 and 48 joined together by crossmember 49 to form a crank support or carrier 50. Ears 46 and 48 of crank support 50 are also provided with aligned openings 46a and 48a. In addition, ear 46 is provided with a lower opening 46b near the bottom thereof. This opening 46b is for receiving adjustment link 52, and particularly a pinlike, inturned end 52a thereof. The other end 52b of link 52 is threaded and connected to a knob 52c so that rotation of knob 52c causes axial displacement of link 52 and thereby pulls the lower portion of ear 46 forwardly and rearwardly.

A lever system or readout mechanism frame 54 is provided for supporting components thereof. Frame 54 is a generally U-shaped channel member, preferably of sheet metal stock, and includes a base 56 and upright, spaced-apart, parallel sidewalls 58 and 60. Base 56 may be provided with suitable means such as openings 56a for securement to the scale base 12 by suitable fastening means. Sidewalls 58 and 60 are provided with spaced-apart through openings 58a and 58b which are generally in registry with each other.

The crank and crank support components previously described are held together as a unit by a pinlike fastening means 62, which preferably is a generally U-shaped structure of wirelike stock having a pair of pin elements or legs 62a and 62b joined together by a bight portion 62c. Leg 62a extends through opening 46a in ear 46 of crank support 50, openings 42a and 44a in ears 42 and 44 of crank 40, and through opening 48a in ear 48 of the crank 50, to pivotally mount the crank 40 with respect to the support 50. Leg 62b extends through opening 58a in frame 54, through openings 46c and 48b in ears 46 and 48 of crank support 50, and out through opening 60a in sidewall 60 of frame 54 to secure the crank support to the frame 54. As previously mentioned, end 52a of adjustment link 52 is received in opening 46b of the crank support.

Figure 4:
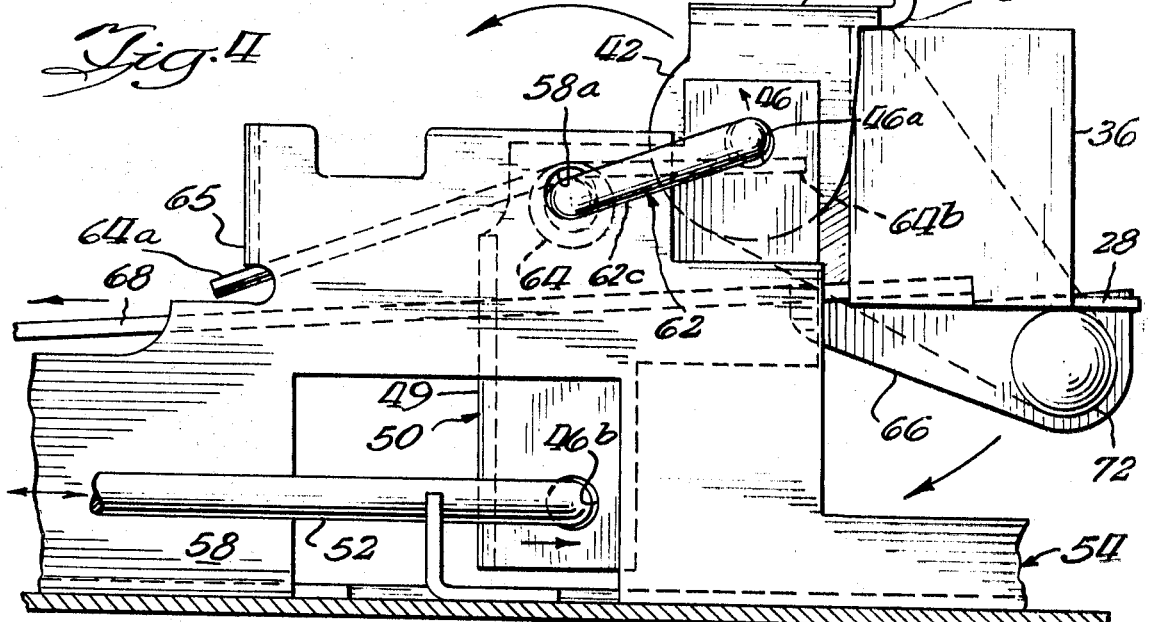
FIG. 4 is a fragmentary enlarged section view taken generally along the lines 4-4 of FIG. 2.
Figure 3:
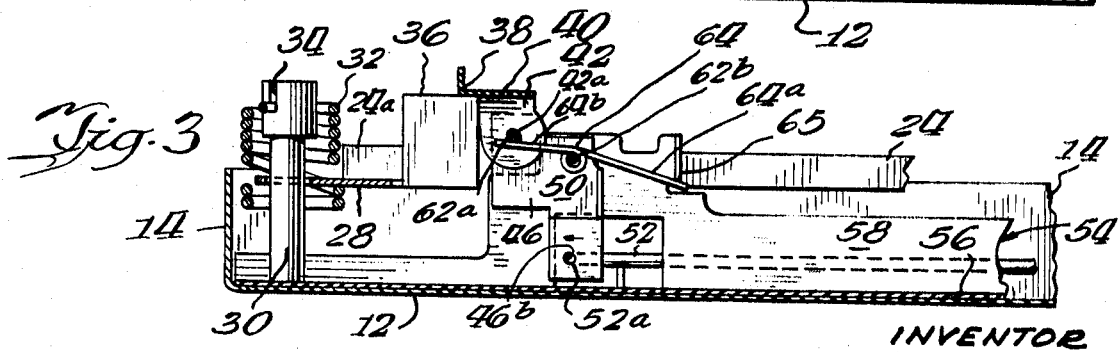
FIG. 3 is a fragmentary section view taken generally along the lines 3-3 of FIG. 2.

Torsion spring 64 is telescoped over leg 62b of fastener 62 with one leg 64a of spring 64 being held under, and biasing upwardly against, an inturned tab 65 formed from sidewall 58. The other leg 64b of torsion spring 64 extends under, and biases upwardly against, the other leg 62a of fastener 62. The effect of this mounting arrangement is best seen in FIGS. 3 and 4. By this arrangement, leg 62b of fastener 62 is forced against the bottom edge of opening 58a in wall 58 and the other openings in alignment therewith, namely the openings 46c and 48b in crank support 50, and the opening 60a in opposite wall 60. Similarly, leg 62a is forced against the top portion of opening 46a and the other openings in alignment therewith, namely the openings 42a and 44a of crank 40 and opening 48a in the opposite ear 48 of crank support 50. Furthermore, inturned end 52a of zero adjustment link 52 is pulled against the rear edge of opening 46b in the bottom of ear 46 of crank support 50. Thus, these three connections are held against movement relative to the openings through which the pinlike portions pass. This provides the advantage of permitting normal manufacturing tolerances to be used with respect to the formation of the aforedescribed openings and pinlike portions while at the same time insuring that, following assembly, the several members will be held together against relative movement with respect to each other, other than the desired intended functional movement of the pivot of the crank and the ability to move the crank support forwardly and rearwardly to adjust the scale for zero setting responsive to threading of knob 52c on link 52.

Crank 40 is provided with an outwardly extending arm 66 on one ear 44. A rack 68 having a toothed edge 70 intermediate its ends is pivoted at 72 to the arm 66 of crank 40. The other or hooked end 74 of rack 66 is connected to the end 76a of spring 76 which, at its opposite end 76b, is connected to a tab 78 formed from wall 58. By this arrangement, the rack is suspended within the frame 54 and constantly urges the crank 40 forwardly, this motion being opposed by the washer extension 28 and its portion 36 which underlies 38 of crank 40.

An upstanding pinion gear 80 is provided in frame 54 in meshing engagement with the toothed edge 70 of rack 68. A disc support 82 is connected with pinion 80 and supports disc 84 which has indicia 86 about the periphery thereof. A magnifying lens 88 is provided at the forward end of the scale and suitable means such as that disclosed in the aforementioned copending application No. 734,273 is provided for projecting the numerical indicia on the viewing window 18 so that a user may obtain a reading of the weight applied to platform 16. Such a reading will result when weight is applied in that the levers 24 and 26 will deflect the washer extension 28, which will cause crank 40 to rotate downwardly, thereby pulling rack 68 rearwardly and rotating the pinion 80, its disc support 82 and the disc 84 therewith so that indicia 86 will appear below the lens 88.

The lip 38 of crank 40 abuts an edge 36 of the washer extension 28. As the zero adjustment link 52 is moved forwardly and rearwardly this will pull the crank carrier forwardly and rearwardly and cause slight rotational movement thereof. However, this rotational movement will be extremely minimal with respect to the engagement of surface 38 and surface 36, but will be relatively significant with respect to the extent that rack 68 is moved forwardly and rearwardly to rotate disc 84 for the zero adjustment. Thus, movement of the crank through a very minute path of arcuate travel will be sufficient to cause significant changes in the angular displacement of disc 84 to affectuate major zero adjustment with little or no effect on the relationship between the crank 40 and the remainder of the lever mechanism.

The structure of this invention provides an independent readout mechanism which is extremely accurate and unaffected by problems of manufacturing tolerances. The entire readout mechanism exclusive of the levers 24 and 26 is contained within the frame 54 which may be independently fastened to the base 12. As such, it is unaffected by warpage or inaccuracies in the construction of the base 12. All of the crank and lever system components are contained within the frame with the aforementioned pin and aperture mounting arrangement for the crank and crank support being of such a nature as to eliminate relative movement between the pins and their apertures and therefore eliminate inaccuracies which may have occurred in these areas.

The foregoing detailed description has been given for clearness of understanding only, and no unnecessary limitations should be understood therefrom, as some modifications may be obvious to those skilled in the art.

I claim:

1. A platform-type bathroom scale comprising: a cover, a base, weight sensing means in the base including crank holding means, a crank element movably mounted in the crank holding means and operably associated with the cover for displacement of the crank element responsive to application of force to the cover, said crank being connected to indicia bearing means to move the same responsive to movement of the cranks, said crank and crank holding means being connected together by a pin and aperture arrangement with biasing means associated with the crank and crank holding connection for continuously urging the pin against a portion of the interior of the aperture to prevent relative movement of the pin transverse to the axis thereof and transverse to the axis of the aperture.

2. A platform-type bathroom scale, comprising: a cover, a base, weight sensing means in the base including crank holding means, said crank holding means including the frame; a crank carrier mounted in the frame by a pin and aperture arrangement; a crank element movably mounted in the frame and connected to the crank carrier, said crank element being operably associated with the cover for displacement of the crank element responsive to application of force to the cover, said crank element also being connected to indicia bearing means to move the same responsive to movement of the crank element, said crank element and frame being connected together by a second pin and aperture arrangement; and biasing means associated with each of said crank carrier and crank element pin and aperture arrangement for urging each pin against a portion of the interior of each aperture to prevent relative movement of each pin transverse to the axis thereof and transverse to the axis of each aperture.

3. The bathroom scale of claim 2 including adjustment means for moving the crank carrier, said adjustment means being connected to the crank carrier by a third pin and aperture arrangement with the same biasing means urging the third pin against a portion of the third aperture to prevent relative movement of the third pin transverse to the axis thereof and transverse to the axis of the third aperture.

4. The bathroom scale of claim 2 wherein the biasing means is mounted on one of the first and second pins and has a portion which bears against the other of the first and second pins.

5. The bathroom scale of claim 4 wherein the biasing means has another portion which biases against a portion of the frame.

6. The bathroom scale of claim 5 including adjustment means for moving the crank carrier, said adjustment means being connected to the crank carrier by a third pin and aperture arrangement with the same biasing means urging the third pin against a portion of the third aperture to prevent relative movement of the third pin transverse to the axis thereof and transverse to the axis of the third aperture.

7. The bathroom scale of claim 6 wherein the biasing means includes a torsion spring mounted on one of said pins and having oppositely extending leg portions which bear against the other of the said pins and bear against the frame respectively